(12) United States Patent  (10) Patent No.: US 8,430,416 B2
Battlogg et al.  (45) Date of Patent: Apr. 30, 2013

(54) MOVEMENT DAMPING APPARATUS

(75) Inventors: Stefan Battlogg, St. Anton im Montafon (AT); Juergen Poesel, Bludenz (AT); Gernot Elsensohn, St. Anton im Montafon (AT)

(73) Assignee: Inventus Engineering GmbH, St. Anton/Montafon (AT)

( * ) Notice: Subject to any disclaimer, the term of this patent is extended or adjusted under 35 U.S.C. 154(b) by 150 days.

(21) Appl. No.: 13/060,091

(22) PCT Filed: Aug. 21, 2009

(86) PCT No.: PCT/EP2009/006091
§ 371 (c)(1),
(2), (4) Date: Feb. 22, 2011

(87) PCT Pub. No.: WO2010/020428
PCT Pub. Date: Feb. 25, 2010

(65) Prior Publication Data
US 2011/0140392 A1  Jun. 16, 2011

(30) Foreign Application Priority Data
Aug. 22, 2008 (AT) ................. A 1306/2008

(51) Int. Cl.
*F16F 9/04* (2006.01)
(52) U.S. Cl.
USPC ........ 280/284; 280/276; 188/267; 188/267.1; 188/267.2

(58) Field of Classification Search ............ 280/284, 280/276; 188/267, 267.1, 267.2
See application file for complete search history.

(56) References Cited

U.S. PATENT DOCUMENTS

| | | | | |
|---|---|---|---|---|
| 5,277,281 A | * | 1/1994 | Carlson et al. | 188/267 |
| 5,573,088 A | * | 11/1996 | Daniels | 188/267 |
| 5,878,851 A | * | 3/1999 | Carlson et al. | 188/269 |
| 6,158,470 A | * | 12/2000 | Ivers et al. | 137/807 |
| 6,202,806 B1 | * | 3/2001 | Sandrin et al. | 188/267.1 |
| 6,260,675 B1 | * | 7/2001 | Muhlenkamp | 188/267 |
| 6,336,535 B1 | | 1/2002 | Lisenker | |
| 6,497,309 B1 | * | 12/2002 | Lisenker | 188/267.2 |
| 6,694,856 B1 | * | 2/2004 | Chen et al. | 89/43.01 |
| 6,722,480 B2 | * | 4/2004 | Carlson | 188/267.2 |
| 6,863,291 B2 | * | 3/2005 | Miyoshi | 280/283 |
| 7,543,687 B2 | * | 6/2009 | Naidu et al. | 188/1.11 E |
| 7,617,032 B2 | * | 11/2009 | Izawa et al. | 701/37 |
| 7,849,983 B2 | * | 12/2010 | St. Clair et al. | 188/267.1 |
| 7,900,755 B2 | * | 3/2011 | Browne et al. | 188/267.2 |
| 2008/0245629 A1 | | 10/2008 | Battlogg et al. | |

FOREIGN PATENT DOCUMENTS

| | | |
|---|---|---|
| EP | 1249637 A1 | 10/2002 |
| EP | 1795428 A1 | 6/2007 |
| EP | 1880936 A2 | 1/2008 |

* cited by examiner

*Primary Examiner* — Kevin Hurley
*Assistant Examiner* — Michael Stabley
(74) *Attorney, Agent, or Firm* — Laurence A. Greenberg; Werner H. Stemer; Ralph E. Locher

(57) ABSTRACT

A movement damping apparatus has magnetorheological fluid that is pressed through a flow path forming a bottleneck in order to dampen a movement. The flow path is divided into at least two flow tracks by a partition that forms an additional friction surface.

15 Claims, 10 Drawing Sheets

MOVEMENT DAMPING APPARATUS

BACKGROUND OF THE INVENTION

Field of the Invention

The invention relates to an apparatus in which a magnetorheological fluid (MRF) is forced through a flow path, preferably in order to damp a movement, with a unit which produces a magnetic field being provided, and with the magnetic field acting on the magnetorheological fluid (MRF) in the area of the flow path.

Apparatuses with magnetorheological fluids are known per se. The advantage is that the damping effect can be influenced by varying the magnetic field. Energy-damping apparatuses are advantageously and/or necessarily used in motor vehicles, not only in the chassis, but also on a range of other components, for example on steering columns, headrests, safety belts, seats and seat elements, etc. Apparatuses such as these are likewise used in other vehicles, for example for the front and rear wheel suspension, in the saddle support, or the like, on cycles. They are likewise used in various sports devices, such as running shoes or ski boots.

Apparatuses such as these are particularly advantageous when it is possible in this way to produce large pressure differences (with or without a magnetic field), and high maximum pressures resulting from them.

This can advantageously be achieved by partition walls in the flow channel through which the magnetic field passes, which partition walls subdivide the flow path and multiply the friction area, without excessively increasing the physical space required.

In this case, EP 1270989 A1 may be cited as prior art, where the magnetic field is produced by a coaxial coil and acts on a magnetorheological fluid in a plurality of annular, concentric channels, which are formed by annular partition walls.

One major disadvantage of embodiments according to the prior art is the coil core, which represents a "magnetic bottleneck" which impedes miniaturization. The entire magnetic flux has to pass through the core in the center of the coil, whose cross-sectional area, through which the magnetic field can pass, decreases with the square of the coil diameter when the latter is reduced in size. However, because of magnetic saturation, only certain flux densities are worthwhile and possible in the core, in the range from 1.5 to 2 Tesla, depending on the material.

The radially externally located channels thus produce a poor area ratio with respect to the internal core, which becomes ever poorer as the core diameter is reduced with the channel cross section remaining the same.

One major disadvantage of the prior art is the varying magnetic flux density in the flow channels, because the area through which the magnetic field passes increases from the inside outward, as a result of which the magnetic flux density decreases severely radially outward (by about half in the case of EP1270989A1). Different flux densities result in different viscosity changes and different pressures, as a result of this, in the flow channels, and this can lead to deformation of the partition walls. It is magnetically advantageous for the wall thicknesses of the partition walls and the distances between the partition walls to be kept small (in the region of 0.1 mm to 1 mm). Since the fan surface area is large (fans occur only in one sense, because the fans are intended to enlarge the friction area) large forces occur on the partition walls even when the pressure differences are small. The (thin) fans can also, inter alia, result from the deformation and this can then lead to a magnetic short and therefore to even greater field strength differences. The correct operation of the apparatus is then no longer ensured.

A further disadvantage of the prior art is that the two sections of a channel through which the magnetic field passes—seen in the flow direction—are physically separated from one another. MRF particles which flow through the channel pass the areas in the magnetic field and form chains there (=viscosity change), but the chains are detached again in the neutral area between the fields.

The time required for chain formation shortens the effective channel length, since the MRF effect does not occur completely during chain formation. Particularly at high flow rates, the time for chain formation must be taken into account, optionally to be compensated for by longer channels. However, longer channels in turn exacerbate the problem of magnetic saturation of the core.

In certain applications, in which the flow of MRF is intended to be blocked completely, it is disadvantageous for the flow channel to be arranged as a plurality of annular, concentric channels. In order to prevent MRF from breaking (flowing) through, the magnetic field must not be less than a certain value at its weakest point in the channel.

This weakest point occurs radially on the outside, where the flux density is lowest. The flux density required for a certain field strength in the radially outermost channel produces a considerably higher flux density in the innermost channel, however, since the area through which the flux passes is smaller.

On the one hand, this can increase the energy demand of the system since very high flux densities are required in the inner area or, on the other hand, produce weak points where the MRF can break through because the field strength required to block the channel is not reached. The field strength cannot be increased indefinitely in order to ensure that the radially outermost channel has a high flux density, since other components can be saturated.

The described disadvantages of a system according to the prior art also relate in the same sense to US 2005087408 A1. The damper described therein uses a coaxial coil to produce a magnetic field which is either shorted by the fans, and therefore does not reach the radially outermost areas or, when the fans are not magnetically permeable, decreases strongly radially outward because of the large air gap and the multiplication of the area through which the flux passes.

In WO2007/149393 A2, the magnetic field always runs parallel to the flowing medium, thus resulting in a reduced viscosity change in the MRF, since large pressure differences can be achieved only when the magnetic lines of force run at right angles to the flow direction. There is also no magnetic return path. In consequence, this design is not very efficient.

Particularly at high pressure levels, very small magnetic-field distribution differences in the fan elements to which pressure is applied result in severe deformation (defects). Operation is then no longer ensured. In designs according to the prior art, this deformation would become ever greater since the unit which produces the magnetic field has a very poor ratio with respect to the radially outermost fan channel.

DE 198 20 570 (Carl Schenk AG) discloses annular fans. These are subject to the same disadvantages as mentioned initially, specifically different effective area size, a changing magnetic field and a changing pressure.

The mixing of bypass channels and blocking channels located alongside one another, as described on page 3 of DE 198 20 570, is thus impossible in the case of MRF and magnetic fields. In the case of designs configured for electrorheological fluids, the electrical field passes from one plate to the other (−pole to +pole) and is closed via a cable, while in the case of MRF applications, the magnetic field must flow back from a magnetic-field producing unit through a large number of elements and then via a magnetic return path to the unit that produces it (the magnetic field is closed), in which case these parts should advantageously have the same cross-sectional areas of magnetically permeable materials. It is therefore technically incorrect to use ERF and MRF apparatuses of the same design.

In EP 1 270 989 and US 2005 087 408, the fan extends over the entire length, when seen in the flow direction. However, this is associated with the disadvantage that the fan walls located between the fan segments through which the magnetic flux passes increase the basic friction (basic pressure), thus reducing the spreading (=difference between switched on and switched off). In the switched-on state, this fan section achieves nothing, because no magnetic field passes through it. This design is therefore disadvantageous.

These disadvantages can be prevented in an apparatus according to the invention, thus allowing miniaturization of the system and the construction of more efficient damping apparatuses.

In one preferred embodiment, this is achieved in that:
the pole surfaces are substantially flat, and
lie parallel to the flow direction of the MRF, and
the switchable MRF channel has the magnetic field applied to it without interruption, seen in the flow direction, and in this case, the flow path which is located between the pole surfaces is subdivided into at least two flow sections by at least one substantially flat partition wall composed of preferably ferromagnetic material.

The partition walls have approximately the same width, thus resulting in a homogeneous magnetic field. However, this is dependent on the lines of force of the magnetic field running substantially at right angles through the partition walls.

Therefore, contrary to the prior art, the magnetic field in the channel is no longer interrupted when a coil is used whose axis runs at right angles to the flow direction. Furthermore, the ratio of the core area through which the flux passes to the channel area through which the flux passes is highly advantageous, since these areas can be approximately the same. Substantially the same flux passes through the individual channels. One major feature of the invention is therefore that the magnetic field strength or the flux density produced by the magnetic-field producing unit (coil, core), is virtually the same (homogeneous) via the fans (partition walls), the channels and the sheath via which the magnetic field flows back to the producing unit. This therefore results in the same viscosity change in the magnetorheological fluid in the individual channels which are influenced by the magnetic field, and the channels with respect to one another, therefore resulting substantially in the same pressure.

According to Hagen-Poiseuille's law, the volume flow, that is to say the volume which flows through a tube per unit time in the case of laminar flow of a homogeneous viscous fluid, is dependent on the fourth power of the radius of the tube. The extreme dependency of the flow resistance on the unobstructed width of the tube is also evident in non-cylindrical channels and applies even with restrictions for non-Newtonian fluids.

Since there are generally design restrictions for indefinite dimensioning of flow paths with sheathing friction surfaces, this often results in the problem of having to achieve high flow resistances, as a result of which movement damping cannot be achieved to the desired extent.

BRIEF SUMMARY OF THE INVENTION

In order to overcome these difficulties, the invention now proposes that the flow path is subdivided by at least one partition wall, which forms an additional friction surface, into at least two flow sections. The flow path has a sheath, that is to say it is formed within a tube, channel or the like. It preferably represents an outlet channel of a container which contains the fluid. This means that, although the partition wall creates only two additional friction surfaces, their influence on the flow resistance is, however, far greater than simple duplication, since the unobstructed width of the sheath which bounds the flow path is approximately halved. In particular, the additional friction surfaces are flat.

In one preferred embodiment, a plurality of partition walls are joined together parallel to one another in at least one pack, as a result of which the effect described above is also considerably reinforced.

The damping can therefore be set in a wide range by means of the magnetic field and, with a maximum magnetic field, it is even possible to block the passage of the magnetorheological fluid up to a pressure of 60 bar, preferably up to 400 bar, and this has also been done. MRF valves according to the prior art generally operate only with maximum pressures of around 30 bar.

The design features described above are not known, and are therefore also not obvious, from the prior art cited above. The optimization of an apparatus such as this which is essential for correct and advantageous operation of the apparatus requires that the viscosity be changed in a very short time by building up and varying the magnetic field. The profile of the lines of force, the cross-sectional shape, the choice of material, the pressure response, deformation, the physical space requirement etc. do not represent a choice of self-evident equivalent options, but are the result of intensive investigations and experiments. It is not simply by chance that there are no details relating to this in the prior art.

Furthermore, the invention is distinguished by a compact design, which is particularly advantageous when the spatial conditions are confined and/or there is a requirement for a low weight (for example in cycle design).

In a first embodiment, the pack can also be formed from partition walls which extend parallel to the flow sections and are kept separated by upright lugs, in particular bent-up edge lugs. The pack can be held together via any desired connection on the lugs, direct adhesive bonding, soldering, adhesive strips or the like. For example, 16 partition walls with a thickness of 0.2 mm can be provided, which subdivide the outlet channel into 17 flow sections of 0.2 mm. The outlet channel therefore has an unobstructed height of 6.6 mm in the area of the friction surfaces. Instead of having to join the pack together from individual elements, it is also feasible to produce the partition wall pack integrally, for example from plastic or metal, by injection molding, die casting or the like.

In a further embodiment, at least one partition wall may extend on a cross-sectional plane of the outlet channel and may have slots which form the flow sections, with the slot walls representing the additional friction surfaces. A partition wall such as this may be produced as a stamped sheet metal part, as a sintered part or as a metal-injection-molded (MIM) part, in which case, for example, it appears to be like a ladder or comb. The remaining webs between the slots can preferably extend on both sides of a central connecting web.

In order to achieve any desired flow section length, a plurality of such partition walls can in this embodiment be arranged in a row close to one another, with the slots being aligned.

In a further embodiment, the pack may have a cavity which is continuous over the length and extends centrally in the flow path. This embodiment makes it possible to pass a component through the pack which is arranged in the flow path. By way of example, this component may be a cable, a piston rod or the like, when a piston which forces the fluid out of the container is pulled rather than pushed.

The formation according to the invention of additional friction surfaces is particularly advantageous when a device is provided which produces a variable magnetic field and has pole surfaces in the flow path, via which pole surfaces the magnetic field acts on the magnetorheological fluid in order to control the flow rate, with the friction surfaces of each partition wall forming parallel pole surfaces in addition to the pole surfaces.

Each partition wall admittedly reduces the cross-sectional area of the outlet channel and therefore the volume of fluid which can be magnetized per unit time, but results in a higher pressure difference due to the reduced distances between two respective pole surfaces, despite the dimensions remaining the same. A plurality of partition walls are therefore preferably joined together to form a pack, and are inserted into the outlet channel. The distances between the pole surfaces that govern the strength of the magnetization are so small in this pack that the height of the outlet channel can be enlarged, in order to match the flow cross section of the constriction to the volume to be magnetized of the magnetorheological fluid to be forced through. If required, when there are a multiplicity of pole surfaces at a short distance from one another, the constriction may even have a larger free cross-sectional area than the container; in this case, the constriction even forms a widened area.

An embodiment which is particularly advantageous and can be produced easily is one in which the partition walls are stamped from transformer laminate and are lacquered on the mutually touching surfaces. The lacquering insulates the individual laminates from one another, as a result of which eddy currents that are created cannot accumulate.

In order to make it possible to influence the viscosity of the magnetorheological fluid by means of a magnetic field such that the flow resistance of the constriction changes, various criteria must be satisfied. A magnetic field produced by a coil must be introduced into the magnetorheological fluid, for which purpose elements and parts of the apparatus which are provided for the lines of force to pass directly through the magnetorheological fluid should be more highly magnetically permeable than other elements and parts which are outside the direct path of the lines of force. Additional pole surfaces that are introduced in this case increase the concentration of the magnetic field on the particles which interact with the magnetic field in the magnetorheological fluid. In this case, turbulence in the flow should be avoided as far as possible, and should at least should not be promoted, in order to improve the effect. The installation of partition walls which have a smooth surface that does not promote turbulence is therefore preferable. Flat surfaces are particularly suitable. Upright webs or edges are disadvantageous. In contrast to this, layers which increase the friction are advantageous.

A coil which is associated with the sheath on the outside of the flow path is therefore provided with a core composed of a magnetically permeable material, such as transformer laminate, ferrite powder, etc., which is referred to in the following text as the coil core material, in particular an iron core which, for example, is C-shaped. The flow path is passed through the gap which remains between the pole surfaces of the C-shaped core. Those walls of the sheath of the flow path which rest on the pole surfaces are composed of magnetically highly permeable material while, in contrast, the side walls are composed of a material which is at least less permeable than the magnetorheological fluid.

The invention makes it possible to provide the sheathing of the flow path with a cylindrical cross section in a simple manner. In this embodiment, the apparatus comprises a continuous cylindrical tube, in which the constriction is formed by the installation of the partition wall, but in particular naturally by the installation of a pack of partition walls as described above, with in each case one element, which has a cross section in the form of a circle segment, and is composed of coil core material, being associated with the pack on both sides as a termination, such that the cylindrical tube is filled. Since the coil rests externally with the pole surfaces of the iron core, the cylindrical tube is composed in particular of a material which is magnetically impermeable or is at least less permeable than the magnetorheological fluid to be forced through the flow sections, in order to prevent a magnetic short via the tube wall. The pack itself can also be constructed such that its magnetic permeability complies with this requirement, for example by partition walls which extend parallel to the flow sections and are composed of coil core material being separated from one another by webs composed of material which is at least less magnetically permeable.

If, as described above, the partition walls are stamped from the coil core material, then the remaining webs cannot consist of a material which is magnetically less permeable; however, it has been found that the webs are magnetically saturated, if appropriately minimized, such that the magnetic field is nevertheless adequately forced through the flow sections. Alternatively, cutouts can advantageously be provided in the partition walls, through which holders composed of magnetically poorly permeable or non-permeable material are passed, and which keep the partition walls separated from one another.

In a further preferred embodiment, which represents a highly space-saving design, the device which produces the variable magnetic field has a core around which a coil is wound, which core forms the partition wall which is arranged in the flow path, with the coil axis being at right angles to the flow sections, and with the flow path having a sheath composed of magnetically permeable material. The partition walls are preferably joined together in two packs, which are arranged on both sides of the core around which the coil is wound. The core, which is arranged between the two packs of partition walls, is preferably in the form of an approximately cuboid block around which the coil winding is placed, whose axis extends through the flow path, at right angles to the flow direction. The core within the coil can likewise contain flow sections if the coil is wound three-dimensionally and leaves the inlet and outlet openings of the flow sections free.

An embodiment having two three-dimensionally wound coils which are located symmetrically on the inside and each have an element which is in the form of a circle segment as a core, and which rests on the inside of the tube is particularly preferable. A pack of partition walls is ranged between the two cores and, as already mentioned above, may have a continuous cavity. This embodiment is also particularly advantageous when the container and outlet channel are manufactured integrally from a continuous cylindrical tube.

If the coil and core form a central partition wall and a pack of partition walls is arranged on both sides, then both packs are in turn completed by an element made of coil core material which has a cross section in the form of a circle segment and whose curved surfaces rest on the inside of the tube. In contrast to the embodiment described above with an externally arranged coil, the tube in this embodiment is composed of coil core material, in order to directly close the magnetic circuit without additional elements.

Starting from the core of the coil approximately in the center of the flow path, the lines of force therefore run at right angles outward through the flow section and a pack of partition walls with additional pole surfaces, and an element which is in the form of a circle segment, into the cylindrical tube, from which they return diametrically opposite through the second element which is in the form of a circle segment and the second flow section and a second pack of partition walls into the core which is wound around and is arranged in the center.

In the case of the apparatus according to the invention, the internal part (coil, partition walls, core) of the device can be moved axially in a cylindrical tube in order to produce the variable magnetic field. In this case, the internal parts can advantageously be pulled or pushed by means of a piston rod, through the hole in which parts the cable for the power supply can be passed, or can be moved by means of a cable.

The invention will now be described in more detail in the following text with reference to the figures in the attached drawings, in which:

DESCRIPTION OF THE INVENTION

Figure 1:
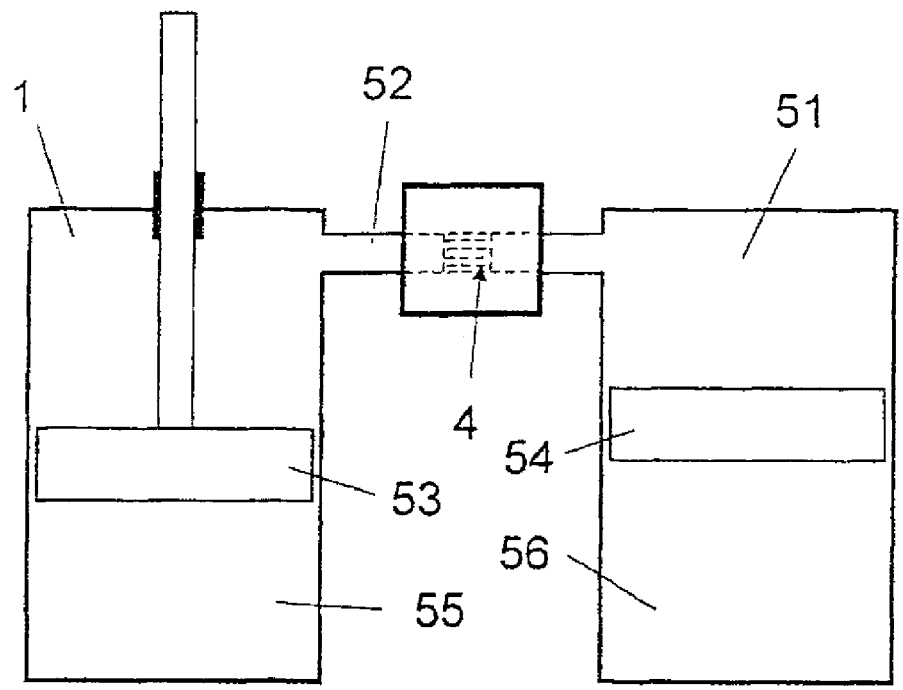
FIG. 1 shows a schematic view of an oscillation damping apparatus of a rear-wheel suspension arm of a cycle.

As is shown in FIG. 1, a movement damping apparatus may be provided, for example, on the rear wheel suspension arm of a cycle, with a container 1 containing a piston 53, which is fixed to the frame of the cycle by means of a piston rod. The container 1 is filled with a fluid, for example a magnetorheological fluid, above the piston. A spring or a gas filling 55 which acts as a spring is arranged under the piston 53. An equalizing container 51 is furthermore fixed to the rear-wheel suspension arm, and the fluid can be forced out of the container 1 via the connecting line 52 into the equalizing container 51. The equalizing container contains a piston 54 and, under the piston 54, likewise a spring or a gas filling 56 which acts as a spring. A constriction 4 is provided in the connecting line 52 and produces an opposing force against the fluid flowing over it, thus resulting in damping. The figure does not show the unit for producing a variable magnetic field.

Figure 2:
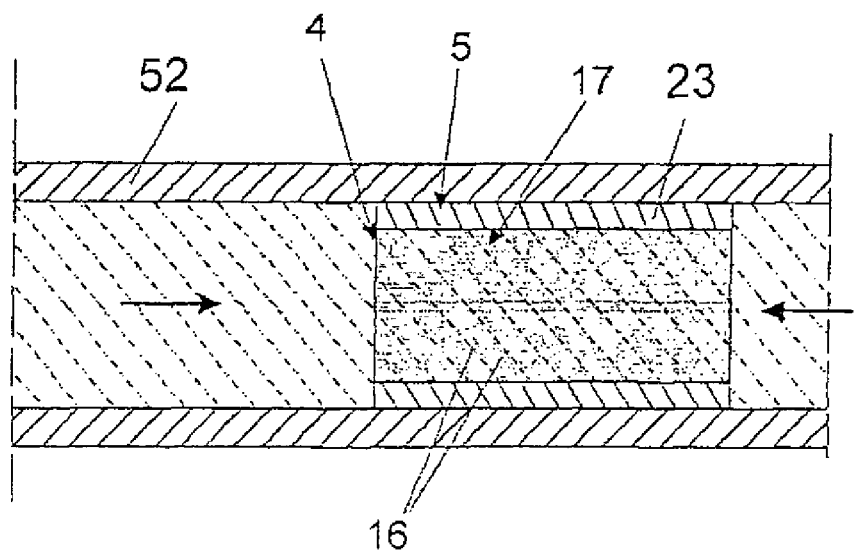
FIG. 2 shows a longitudinal section through the connecting line shown in FIG. 1.

FIG. 2 shows a longitudinal section through the line 52. The constriction 4 is formed by a pack 17 of flat partition walls 15 which is inserted into the flow path 5, and between which partition walls 15 a multiplicity of flow sections 16 remain. If the flow path 5 is sheathed by a cylindrical tube which represents a part of the line 52, then an upper and a lower element 23 in the form of circle segments are fitted to the pack 17 of partition walls 15 and rest on the inside of the line 52. The flat partition walls 15 each have two additional friction surfaces for the fluid, which result in a very high flow resistance over a short length in the flow path.

Figure 3:
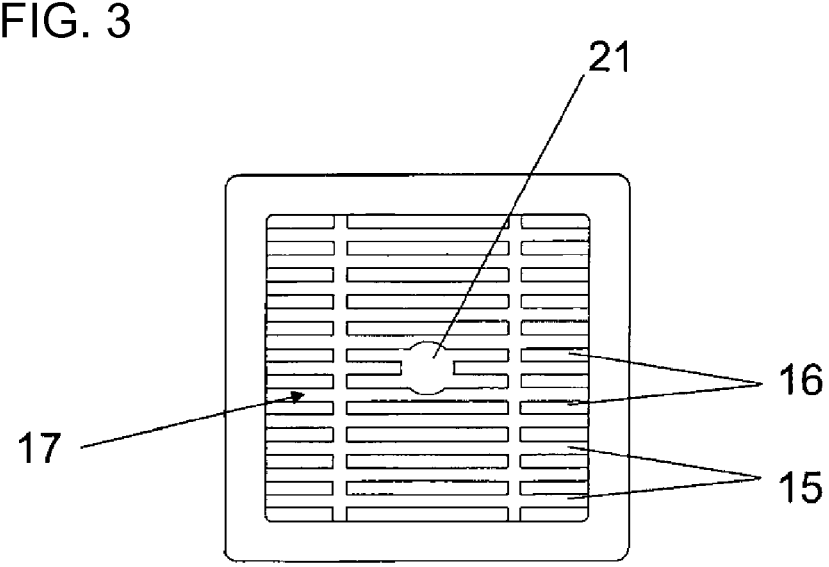
FIG. 3 shows a cross section through the flow path shown in FIG. 2.

FIG. 3 shows a further embodiment of the partition wall pack 17. In this case, the partition walls 15 are provided cohesively in a plastic or metal injection-molded part or die-cast part, which can be inserted into a tube or line as an integral element. The pack 17 has a central cavity 21 through which, for example, a line, a cable, a rod or the like can be passed.

If the movement damping process is intended to be made dependent on any criteria, then a magnetorheological fluid can be used, which is forced through the flow path 5 and whose flow characteristics can be influenced by a device 2 for producing a variable magnetic field. In this case, the partition walls are preferably formed from a magnetically permeable material, as a result of which the friction surfaces also form pole surfaces when a magnet coil 7 with a core 6 is provided, and whose pole surfaces 11, 12 are parallel to the friction surfaces. In this case, the coil 7 is arranged such that its axis is at right angles to the flow sections 16 between the partition walls 15.

Figure 4:
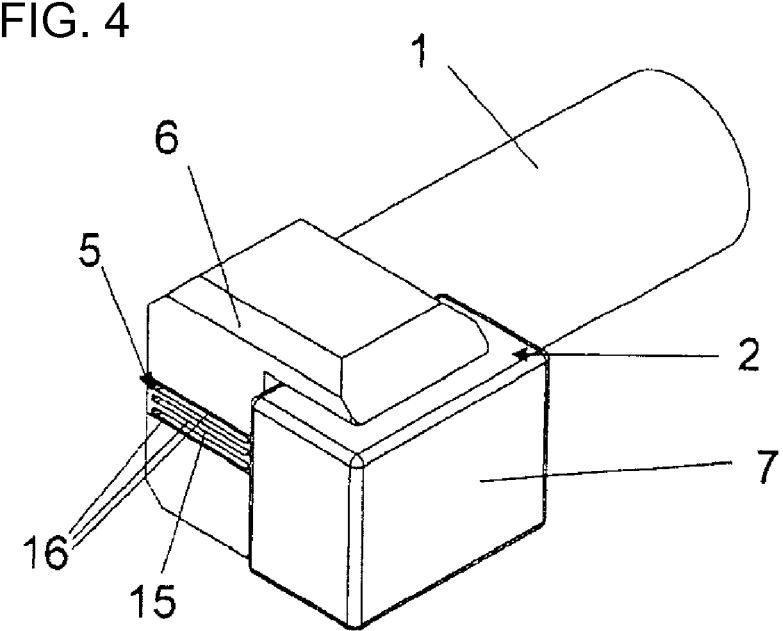
FIG. 4 shows a schematic oblique view of a first embodiment of the apparatus according to the invention.
Figure 5:
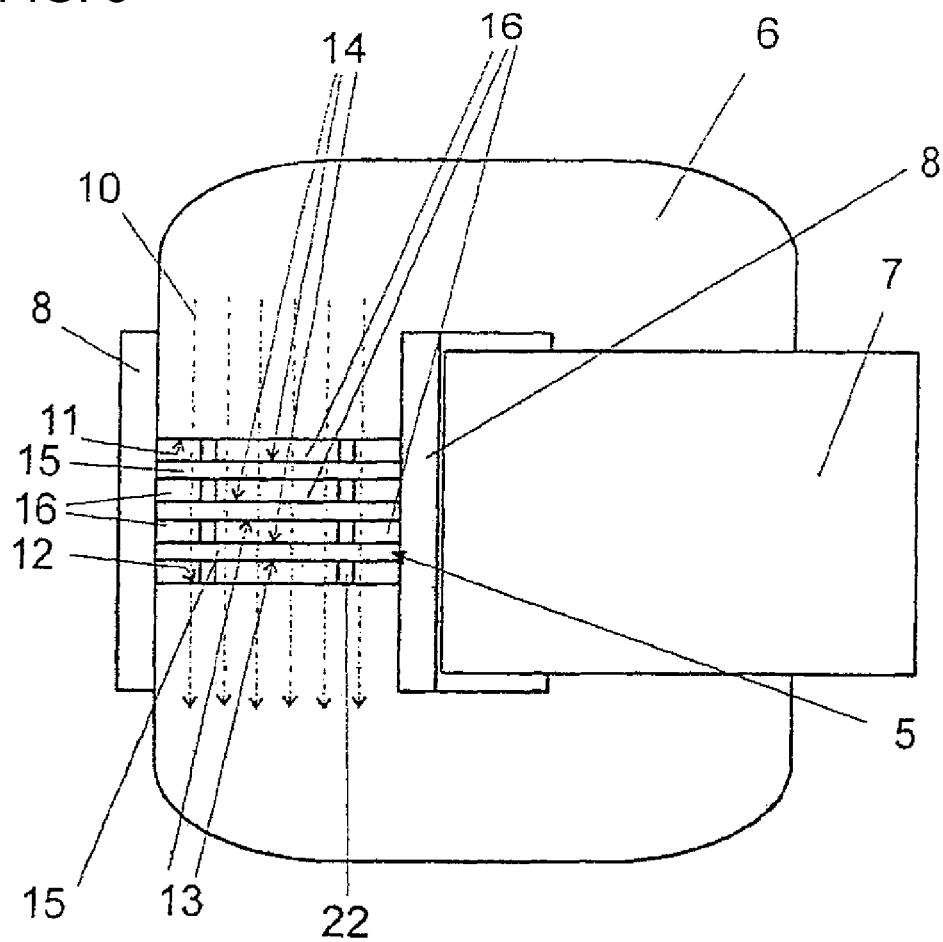
FIG. 5 shows an end view of a first embodiment of the apparatus as shown in FIG. 4, with the profile of the lines of force of a magnetic field.

Details of another embodiment can be seen better in FIGS. 4 and 5. In particular, a container 1 is cylindrical and contains a movable piston, by means of which the magnetorheological fluid 3 is forced through the flow path. The subsequent outlet channel has an approximately rectangular cross section, and the flow path 4 is subdivided by partition walls 15, which are composed of a highly permeable coil core material and two of which are shown in FIG. 4, into flow sections 16 which have a considerably shorter height, although they have the same width. The device 2 which produces the magnetic field in this embodiment has a coil 7 which is provided with a C-shaped core 6 composed of a magnetically highly permeable coil core material, for example iron, and whose axis is at right angles to the flow direction of the magnetorheological fluid 3 in the flow path 5 and the flow sections 16 formed by the partition walls 15. The C-shaped core 6 can also be composed of laminates, in particular transformer laminates.

In addition to iron as a very good material with good "magnetic" characteristics, the following may also be used as coil core materials:

Silicon-iron, a relatively good material with good magnetic characteristics, poor electrical conductivity and very low remanance, magnetic steel, a material which costs somewhat more, does not corrode and has somewhat poorer magnetic characteristics, nickel-iron, a traditional soft-magnetic alloy which costs more and has a very high permeability, and iron-cobalt, as the most expensive material, but with the highest saturation flux density.

Depending on the installation location, other materials are possible (for example a core composed of ferrite, iron powder or other powder mixtures). More "exotic" materials may offer advantages (for example BASF Catamold FN50; which is compatible with injection molding).

The C-shaped core 6 has flat, mutually parallel pole surfaces 11, 12, between which the outlet channel is passed. The magnetic permeability of the magnetorheological fluid 3 is less than that of the core 6, as a result of which the strength of the magnetic field indicated by the lines of force 10 in FIG. 5 is dependent on the height of the gap between the pole surfaces 11, 12. Every partition wall 15 reduces the height and forms additional flat pole surfaces 13, 14. If only one partition wall 15 is provided, then the pole surfaces 11 and 14 are associated with the upper flow section 16, and the pole surfaces 13 and 12 are associated with the lower flow section 16. Every further flow section 16 located in between can be influenced by pole surfaces 13 and 14 of two partition walls 15. In the embodiment shown in FIG. 4, the flow path 5 is provided in that section of the outlet channel which passes the core 6 with three flow sections 16 which occupy virtually the entire width. In the embodiment shown in FIG. 5, the side walls 8 of the outlet channel are composed, at least within the flow path 5, of a magnetically at least poorly permeable material, and the partition walls 15 composed of coil core material are separated from one another by webs 22, which are likewise composed of a magnetically at least poorly permeable material.

Figure 7:
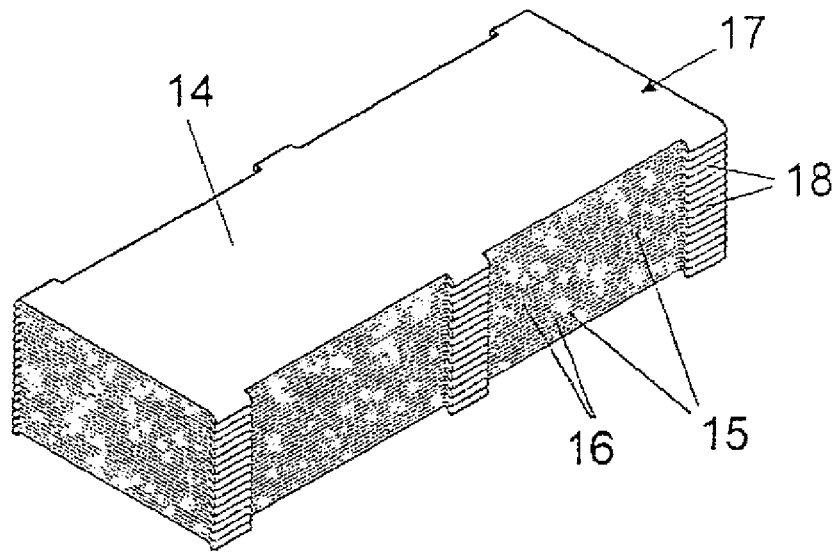
FIG. 7 shows an oblique view of a pack of partition walls of a first embodiment.

FIG. 7 shows partition walls 15 which have bent lugs 18 on the two longitudinal side edges, which lugs 18 keep the partition walls 15 separated, with the partitions walls 15 bounding a multiplicity of flow sections 16. The partition walls 15 are connected to form a pack 17 via the lugs 18 by adhesive bonding, soldering or the like, which pack 17 can be pushed as a unit into the outlet channel. By way of example, the partition walls 15 are composed of a transformer laminate, that is to say a material with very high magnetic permeability, and the pack 17 shown in FIG. 7 in each case comprises sixteen partition walls 15 and flow sections 16, which all have the same thickness or height of, for example, 0.2 mm. The pack 17 therefore has an overall thickness of 6.4 (6.2) mm.

Figure 6A:
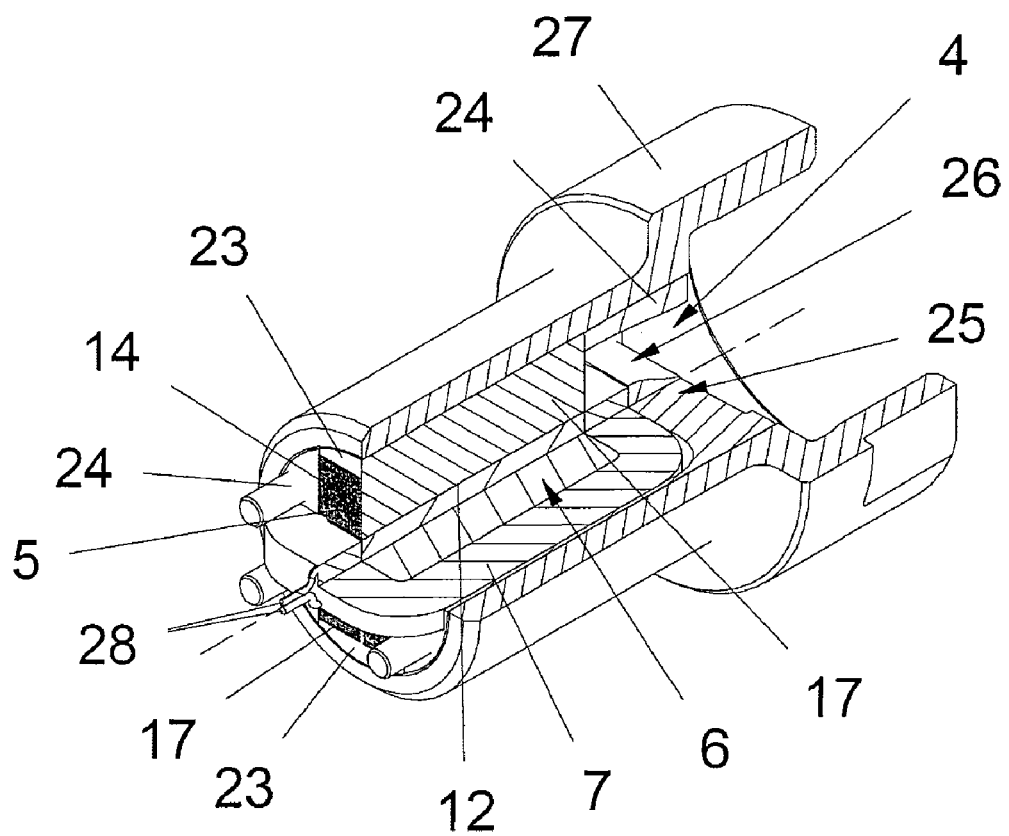
FIG. 6a shows a partially sectioned oblique view of a third embodiment without tangential edges.
Figure 6B:
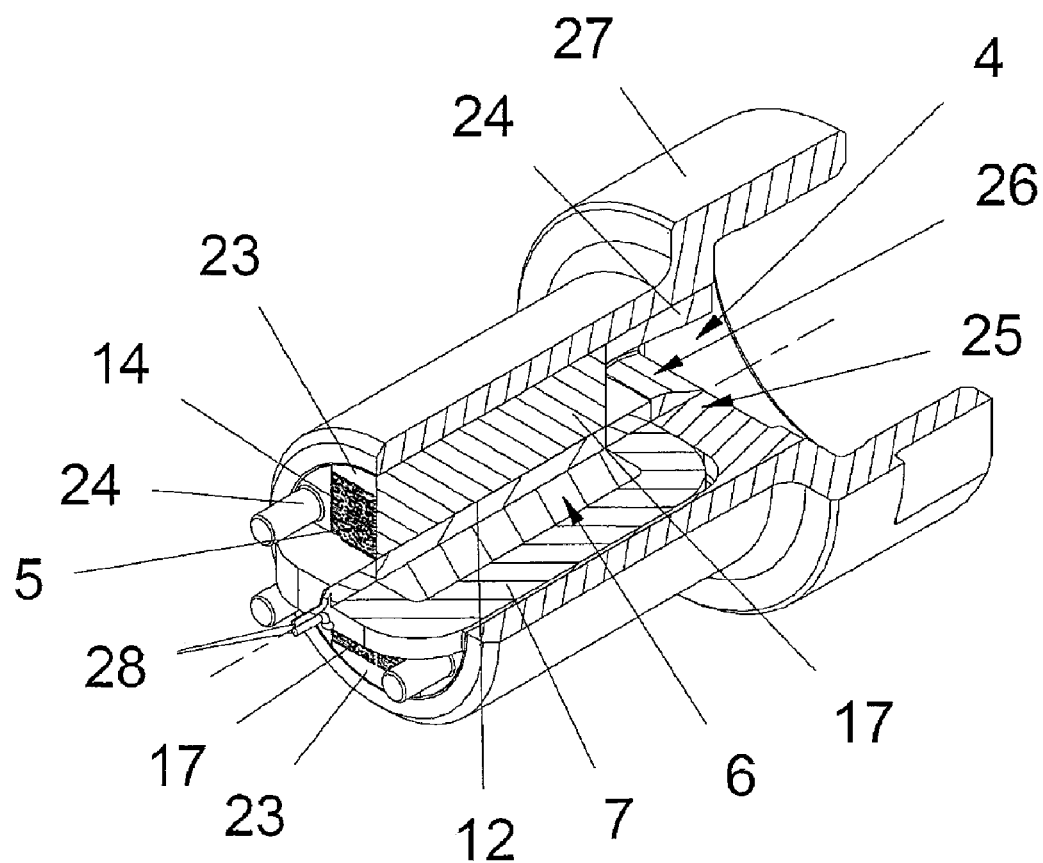
FIG. 6b shows a partially sectioned oblique view of a third embodiment with tangential edges.
Figure 8:
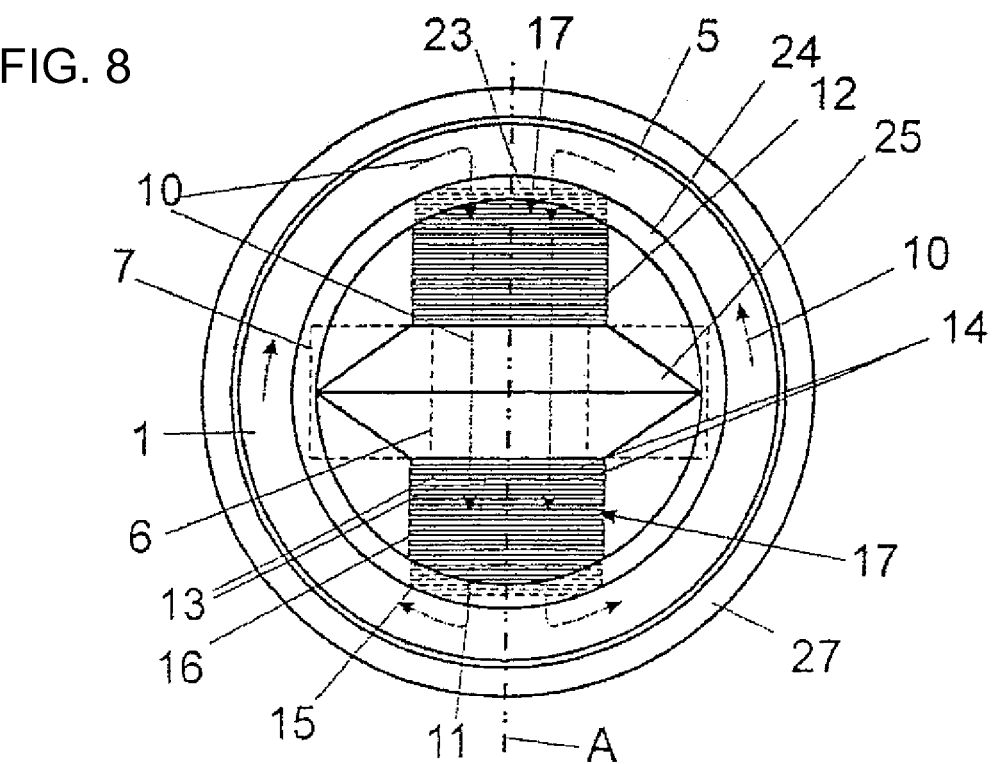
FIG. 8 shows an end view of the embodiment as shown in FIG. 6.

FIGS. 6 and 8 to 10 show an embodiment in which the magnet coil arrangement is provided in the interior of the flow path 5. FIG. 6 shows an oblique view, sectioned at an angle, of the outlet channel, illustrated in the form of a cylindrical tubular piece with a threaded collar 27. The container 1, which is likewise formed by a tubular piece of the same diameter, is screwed into the threaded collar 27. The constriction 4 at the start of the flow path 5 is formed by a wedge-shaped center web 25 of an insert 24, as a result of which the magnetorheological fluid 3 which emerges from the container 1 is subdivided into two flow elements 26. The coil arrangement 2 has a magnet coil 7, whose axis is at right angles to the flow path 5 and is arranged centrally in the outlet channel such that it is covered by the wedge-shaped center web 25 (FIG. 8). The core 6 is once again arranged within the coil 7, with the core 6 in this embodiment being cuboid and being adjacent on both sides to a pack 17 of partition walls 15 with a multiplicity of flow sections 16, as is described in FIG. 7 or, in the following text, with reference to FIGS. 9 and 10. A permanent magnet or a combination of permanent magnets and soft-magnetic materials may be used as the core. An element 23 which is approximately in the form of a circle segment (pole cap) is in each case fitted as a termination for each pack 17, which element 23 is manufactured from coil core material and rests on the inside of the cylindrical outlet channel.

In this embodiment, the outlet channel is likewise produced from a coil core material, for example from an iron tube or the like, in order to close the magnetic lines of force 10. The electrical connecting lines 28 are passed out of the outlet channel, in a manner which is not illustrated in any more detail, at the outlet-side end.

Figure 9:
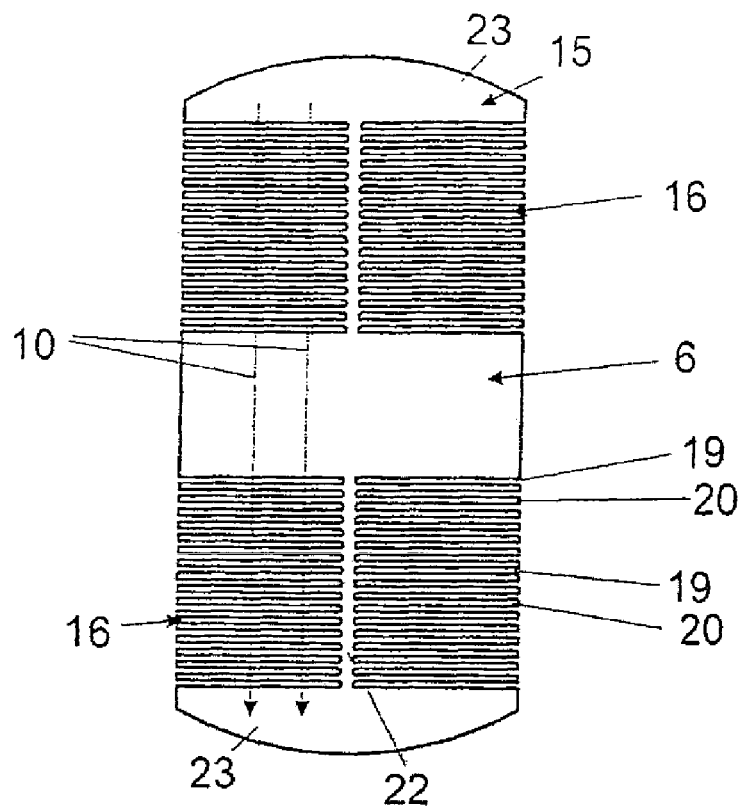
FIG. 9 shows a second embodiment of a partition wall.
Figure 10:
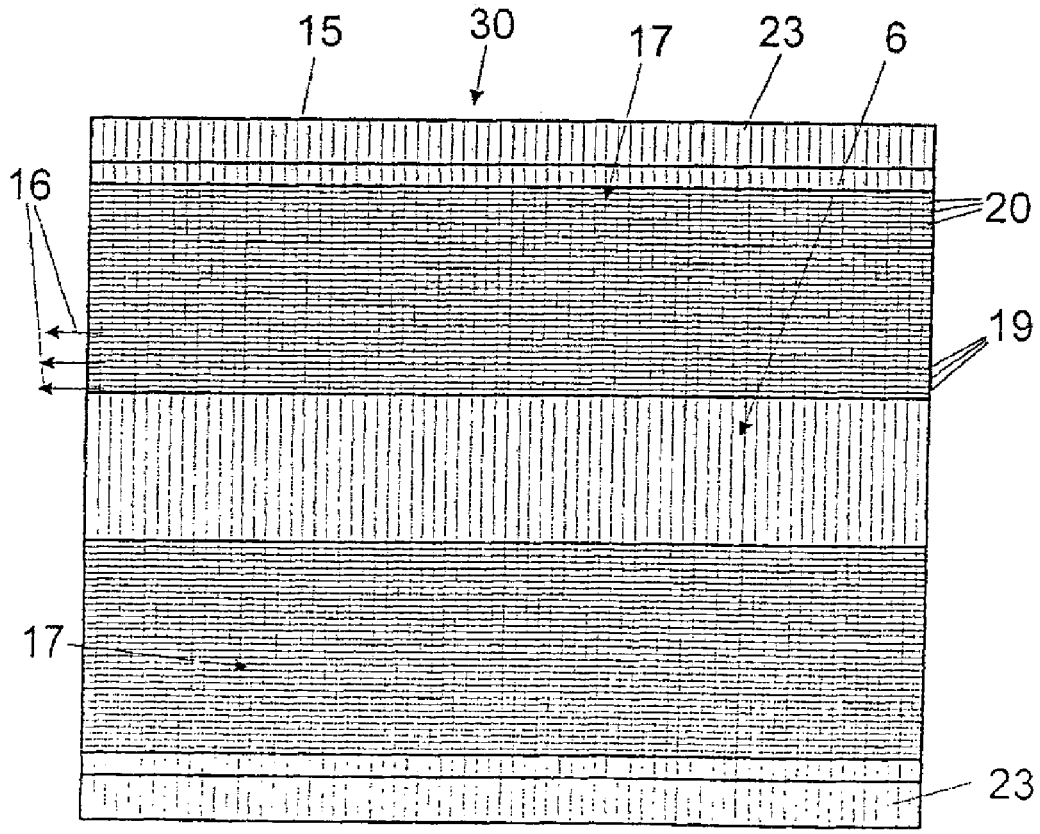
FIG. 10 shows an enlarged side view of a pack of partition walls of the second embodiment.

As already mentioned with reference to FIG. 7, the pack 17 may be composed of partition walls 15 which extend in the longitudinal direction of the flow path 5. FIGS. 9 and 10 show a second possible way to design a pack 17 of partition walls 15 with flow sections 16. In this case, each partition wall 15 extends on a radial plane at right angles through the outlet channel, and the flow sections 16 are composed of slots 19 which are incorporated in the partition walls 15. A partition wall 15 such as this may, in particular, be stamped from a transformer laminate or the like, with a multiplicity of slots 19 being separated from one another by webs 20 which project from a central connecting web 22 (FIG. 9). The slots 19 thus extend toward the edge, and are covered by side parts of the insert 24. Connecting webs 22 could, of course, also be provided on both edges, with the slots 19 extending between them without any center interruption. As is shown in FIG. 10, a plurality of partition walls 15 are arranged directly one behind the other, with the slots 19 being aligned. In this case, the slot walls represent the additional pole surfaces 13, 14.

It is also feasible for the partition wall pack to be in the form of a folded element.

Manufacturing by stamping from transformer laminate or the like also makes it possible to produce the coil core 6, both packs 17 of partition walls 15 and the terminating elements 23, which are in the form of circle segments, for matching to the cylindrical cross section of the outlet channel 5 in one piece, which is then in the form shown in FIG. 9. Those side surfaces of the partition walls 15 which rest on one another can be provided with an electrically insulating lacquer, such that eddy currents which are created in the individual partition walls 15 do not accumulate. The part 30 shown in FIG. 10 is fitted with the coil 7 and is inserted into the insert 24, which is then introduced into the outlet channel or the line 52, and is axially fixed. The insert 24 is composed of a magnetically poorly permeable material, for example a plastic.

Figure 11:
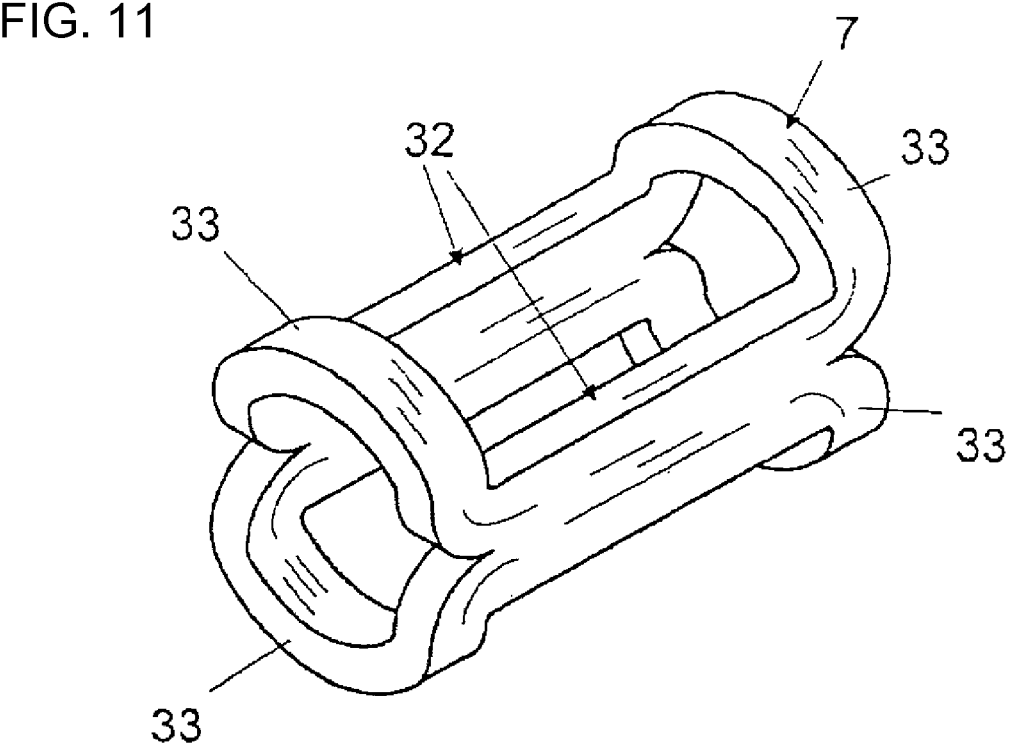
FIG. 11 shows an oblique view of a second embodiment of a magnet coil.
Figure 12:
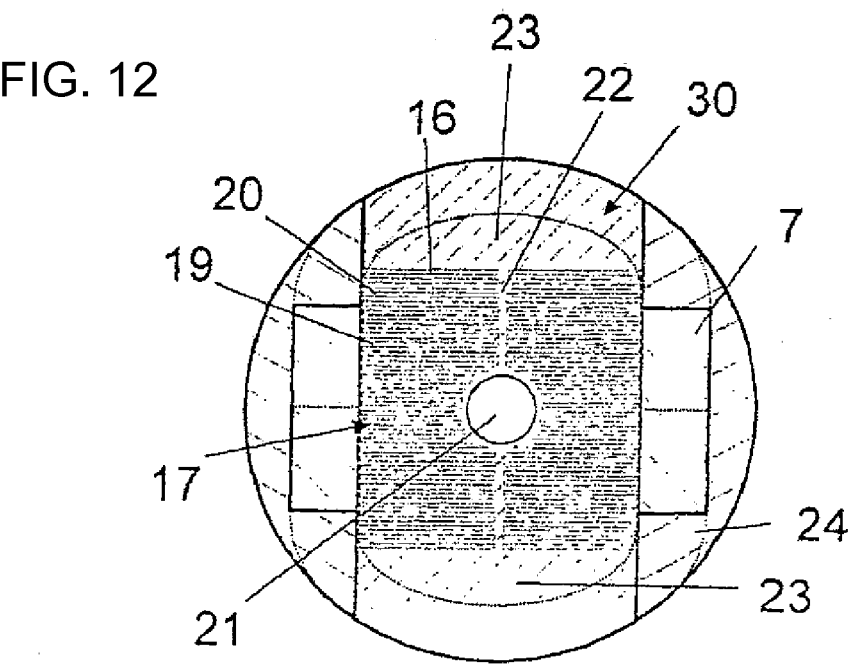
FIG. 12 shows a cross section through a further embodiment of the apparatus with a magnetic coil as shown in FIG. 11.

FIGS. 11 and 12 show two embodiments, in which the coil 7 is wound three-dimensionally, that is to say each winding is not located on a plane but is composed of a plurality of sections, with in each case one approximately semicircular section 33 being routed upward or downward between the straight sections 32 which extend in the longitudinal direction of the flow path 5 in the outlet channel. The coil 7 is therefore open at the ends, and a part 30 as shown in FIG. 12 can have a central cavity 21 through which, for example, the pulling means mentioned above can be passed to the piston or base of the container 1. However, the cavity 21 may also be used to hold a connecting element for the pack 17 of partition walls 15, or the cable 34 that is shown in FIG. 1. Since the coil 7 is spread out at the ends, the core 6 may also have flow sections 16 within the coil 7 which are formed by slots 19 between aligned webs 20.

The form shown in FIG. 11 may also be created for the two coils 7, as is indicated in FIG. 12. In this embodiment, each of the two coils 7 is associated with the element 23, which is in the form of a circle segment, as a core, with a pack 17 of partition walls 15 being arranged between the two elements 23 and having flow sections 16 and a central cavity 21. The insert 24 is annular and is inclined toward the container 1, forming the constriction 4 (FIG. 6).

The device which is arranged in the magnetorheological fluid 3 or in the flow path 5 and is designed to produce the variable magnetic field may also comprise a printed circuit board with a planar coil and a core, in which case even further electronic components for controlling the device 2 may also be arranged on the printed circuit board.

The coils 7 may be manufactured not only from an insulated copper wire but also from a copper strip, a copper foil or an anodized aluminum foil.

Figure 13:
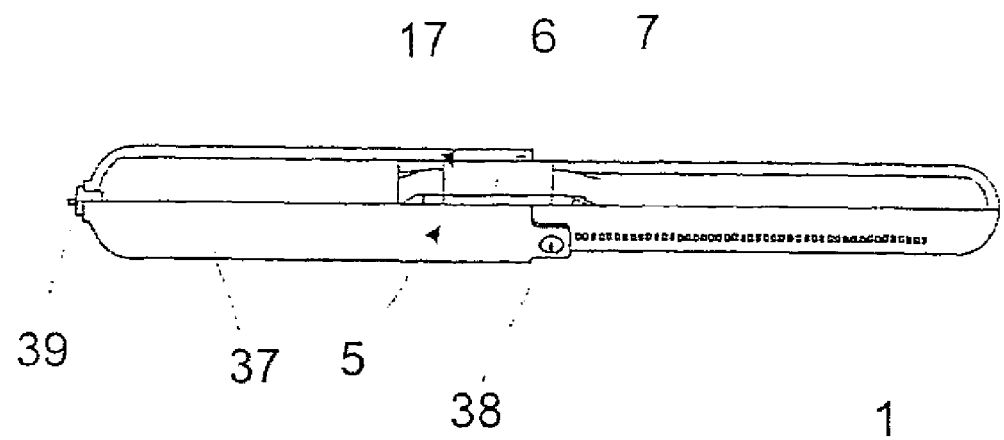
FIG. 13 shows a partial longitudinal section through a fourth embodiment of the apparatus.

FIG. 13 shows an embodiment in which a container-like closure 37 is fitted, forming a seal, to the container 1, at one of whose ends the flow path is provided, in which case the container 1 and the closure 37 can be pushed one inside the other in order to reduce the internal area. The closure 37 is provided with a sensor 38, with which a length measurement scale on the container 1 is associated, such that the sliding movement can be recorded. Furthermore, the closure 37 is provided with a pressure sensor 39, thus allowing the magnetic field of the internal coil 7 within the flow path 5 to be varied as a function of pressure and/or position. By way of example, this embodiment could be used in a saddle support of a cycle.

Figure 14:
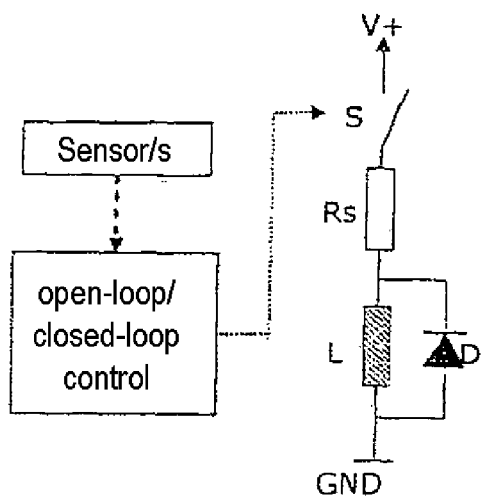
FIGS. 14 and 15 show two circuit diagrams for the operation of the apparatus according to the invention.

FIG. 14 shows an example of a simple, pulsed drive (PWM), in which the coil current can be varied. In the simplest form, the switch S may be a mechanical switch/push button; it is advantageous to use a transistor. However, other options are also feasible, such as a relay or else special forms of the transistor (MOSFET, IGBT). Inter alia, the switch may also be provided in the GND branch, that is to say between the coil and ground (GND). The resistor Rs is intended to symbolize the option of current measurement. This can be done in addition to measurement via a shunt by other methods such as a current transformer or an integrated solution (current measurement—IC, Hall sensor). The current can be measured at any desired point in the circuit. The diode D is a freewheeling diode, which allows the coil 7 to continue to drive current after S has been opened. The diode can likewise be replaced by a switch (Sync-FET).

In addition to the simple control-system option, the control system can also be equipped with various sensors which make it possible to form a closed loop. Depending on the purpose, pressure, force, position, temperature, speed or acceleration sensors, for example, may be used. It is also feasible to combine these or other sensors.

Figure 15:
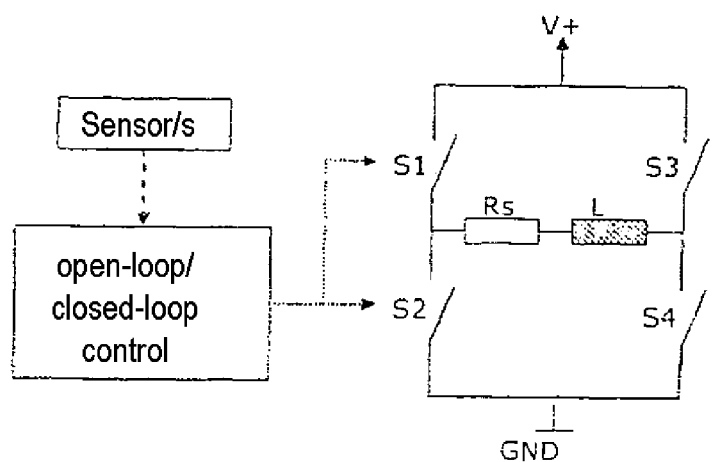

FIG. 15 shows an example of a drive by means of a full bridge (H-bridge). The coil L can thus be driven in both directions, that is to say the polarity at the coil connections can be changed. By way of example, this allows a permanent magnet in the magnetic circuit of the coil to be used for reinforcement or attenuation. In the case of a pulsed drive (PWM), the coil current can be varied. The resistor Rs is intended to symbolize the option of current measurement. This can be done in addition to measurement via a shunt by other methods such as a current transformer or an integrated solution (current measurement-IC, Hall sensor). The location of the current measurement may vary, and, for example, measurement in the ground (GND) branch is advantageous, in order to obtain a measurement signal that is referenced to GND. Inter alia, duplicated measurement, for example upstream of S2 and upstream of S4, may also offer advantages since this results in the current being measured in each half-bridge arm (fault detection). In addition to the simple control-system option, the control system in this embodiment may also be equipped with various sensors which make it possible to form a closed loop. Depending on the purpose, pressure, force, position, temperature, speed or acceleration sensors, for example, may be used. It is also feasible to combine these or other sensors.

Figure 16:
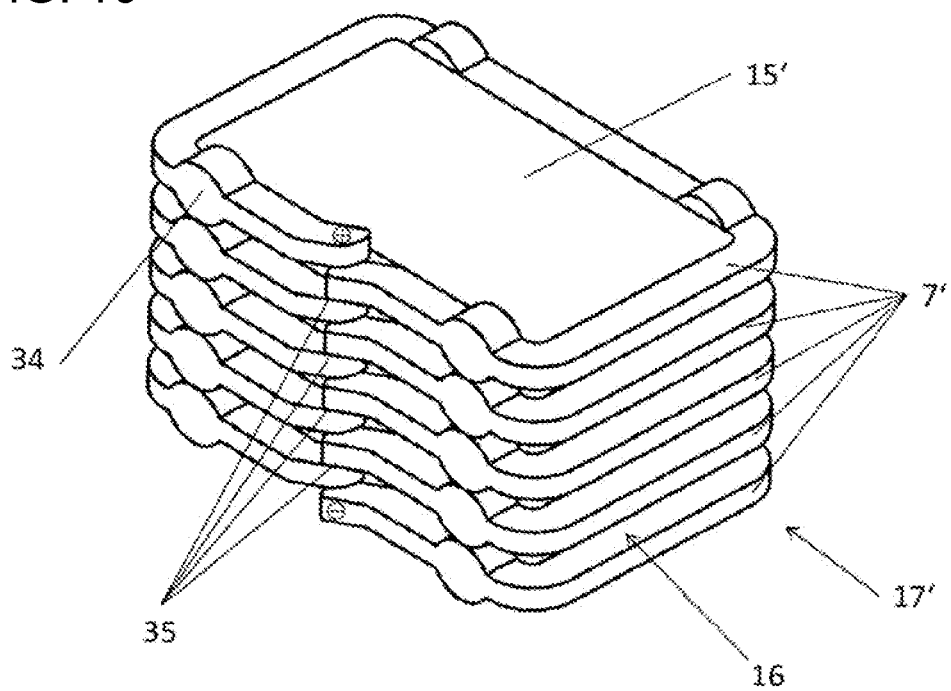
FIG. 16 shows a perspective view of a partition wall stack with individual partition wall coils.

FIG. 16 shows an exemplary embodiment of a partition wall stack in which the flow path is subdivided into a plurality of flow sections 16 by partition walls 15' which are arranged at a distance from one another. One of these flow sections is illustrated by way of example in FIG. 12, together with an indication of the flow direction.

In this exemplary embodiment, each partition wall 15' composed of magnetically permeable or ferromagnetic material has its own associated partition wall coil 7', which in each case consists of only a single turn. By way of example, this turn may be formed by an insulated conductor.

Electrically, the individual partition wall coils are connected in series, with the output of the respective partition wall coil 7' located above being connected to the input of the partition wall coil 7' located below. The contact points are annotated 35.

These partition wall coils 7' may be provided alternatively or in addition to the coil 7 in the previous figures. If they are provided only as an alternative to this coil, then these partition wall coils together form this coil 7.

At least on the inlet-flow side or outlet-flow side, the turn is preferably at most as high as the partition wall itself, thus not impeding the flow through. The coil may be higher on the side surfaces. The spacers 34 (for example formed in the insulation of the partition wall coil 7') and the contacts 35 may also be arranged here. The coil turn may also be composed of an anodized aluminum foil. It is also possible to apply this turn to a printed circuit board. The printed circuit boards are then stacked as a multilayer.

The partition walls 15' are preferably composed of magnetically permeable, ferromagnetic material, and form the core of the individual partition wall coils.

The core (6), the partition walls (15) and the sheath may each be partially or entirely in the form of permanent magnets. For this purpose, they are at least partially manufactured from materials such as magnetic iron alloys or steel alloys, ferrite, AlNiCo, rare earths such as SmCo and NeFeB. Manufacture is also feasible in combination with other materials, for example as is the case with plastic-bonded magnets.

If these partition wall individual coils are used, the coil—as already mentioned—from the previous exemplary embodiments with the reference number 7 may be omitted. This results in a weight and space advantage. However, both coils, specifically the coil 7 and the partition wall coils 7', may be used for particularly strong magnetic fields.

The invention claimed is:

1. A movement damping apparatus, comprising:
an amount of magnetorheological fluid to be forced through a flow path, the flow path forming a constriction in order to damp a movement;
a magnet unit configured to produce a magnetic field acting on said magnetorheological fluid via pole surfaces effective in said flow path; and
at least one substantially flat partition wall disposed to divide said flow path into at least two substantially flat flow sections, said at least one partition wall forming an additional friction surface in said flow path; and
wherein said magnet unit and said flow path are relatively configured such that, when a maximum magnetic field is applied, a passage of the magnetorheological fluid through said flow sections is blocked.

2. The apparatus according to claim 1, wherein a shape of all said friction surfaces in said through-channel is substantially the same.

3. The apparatus according to claim 1, wherein a magnetic field strength or a flux density is substantially identical in all of the flow sections.

4. The apparatus according to claim 1, wherein said additional friction surfaces are planar surfaces.

5. The apparatus according to claim 1, wherein said partition wall is one of a plurality of partition walls joined together parallel to one another in at least one stack.

6. The apparatus according to claim 5, which comprises spacers holding said partition walls separate from one another and extending parallel to said flow sections.

7. The apparatus according to claim 1, wherein said partition wall extends on a cross-sectional plane of said flow path and said partition wall is formed with slots defining said flow sections, with said slots having slot walls representing said additional friction surfaces.

8. The apparatus according to claim 1, which comprises a cylindrical sheath encasing said flow path, and elements formed as circle segments with curved surfaces and defining said pole surfaces, said curved surfaces of said elements being matched to an inner wall of said sheath.

9. The apparatus according to claim 1, wherein said magnet unit is disposed to generate a magnetic field with flux lines running substantially at right angles through said flow sections.

10. The apparatus according to claim 1, wherein said magnet unit is a device configured to produce a variable magnetic field having a core and a coil wound around said core, said core forming said partition wall disposed in said flow path, and a coil axis extending at right angles to said flow sections, and wherein said flow path is defined within a sheath composed of magnetically permeable material.

11. The apparatus according to claim 1, wherein said partition walls are stamped from transformer laminate and are insulated, at least on mutually touching surfaces.

12. The apparatus according to claim 1, wherein said magnet unit is a device configured to produce a variable magnetic field having a core and a coil wound around said core, said core being formed with flow channels and said coil is wound leaving inlet and outlet openings of said flow channels free.

13. The apparatus according to claim 1, wherein a core of said magnet unit, said partition wall, pole caps, and a container are at least partially formed of or with a material selected from the group consisting of magnetic iron alloys or steel alloys, ferrite, AlNiCo, and rare earths.

14. The apparatus according to claim 13, wherein said core of said magnet unit, said partition wall, said pole caps, and said container are at least partially formed of or with a material selected from the group consisting of SmCo and NeFeB).

15. A bicycle, comprising a frame, a suspension fork, a rear structure, and an apparatus according to claim 1 disposed between said frame and said suspension fork or said rear structure.

* * * * *